United States Patent
Chambers

(10) Patent No.: US 9,852,555 B2
(45) Date of Patent: *Dec. 26, 2017

(54) VEHICLE IMPACT SENSOR AND NOTIFICATION SYSTEM

(71) Applicant: Christopher Chambers, Phoenix, AZ (US)

(72) Inventor: Christopher Chambers, Phoenix, AZ (US)

(73) Assignee: Christopher Chambers, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,247

(22) Filed: Feb. 22, 2017

(65) Prior Publication Data

US 2017/0161971 A1    Jun. 8, 2017

Related U.S. Application Data

(63) Continuation of application No. 14/946,257, filed on Nov. 19, 2015, now Pat. No. 9,586,549.

(Continued)

(51) Int. Cl.
*B60Q 1/00* (2006.01)
*G07C 5/08* (2006.01)
(Continued)

(52) U.S. Cl.
CPC ........ *G07C 5/0816* (2013.01); *B60R 21/0134* (2013.01); *B60R 21/0136* (2013.01);
(Continued)

(58) Field of Classification Search
None
See application file for complete search history.

(56) References Cited

U.S. PATENT DOCUMENTS

2005/0154530 A1* 7/2005 Hosokawa ............ B60R 21/013
  701/301
2008/0147280 A1* 6/2008 Breed ...................... B60J 10/00
  701/46

(Continued)

OTHER PUBLICATIONS

Event data recorder, https://en.wikipedia.org/w/index.php?title=Event_data_recorder&oldid=691288873 (last visited Nov. 19, 2015).

(Continued)

*Primary Examiner* — Julie Lieu
(74) *Attorney, Agent, or Firm* — Fish & Richardson P.C.

(57) ABSTRACT

The present disclosure involves systems, software, sensors, and applied solutions for detecting incidents associated with a vehicle, where sensors associated with the vehicle identify impacts or proximity alerts to other vehicles and objects and record information related to those detected incidents. The recorded information can be immediately communicated to interested parties of the person or entity (e.g., emergency responders, business contacts) associated with the vehicle, or alternatively, stored for inspection at the vehicle and reviewed at a destination along the vehicle's route. In one example method, operations include detecting an incident associated with a monitored vehicle, where detecting the incident comprises receiving an alert from at least one sensor associated with the vehicle, identifying a location of the vehicle in response to the detection, and storing a record of the detected incident, where the record includes the identified location of the vehicle and a time associated with the detected incident.

20 Claims, 5 Drawing Sheets

Related U.S. Application Data

(60) Provisional application No. 62/123,571, filed on Nov. 20, 2014.

(51) Int. Cl.
  *B60R 21/0136* (2006.01)
  *B60R 21/0134* (2006.01)
  *G08G 1/00* (2006.01)
  *B60R 21/00* (2006.01)

(52) U.S. Cl.
  CPC .......... *G07C 5/0841* (2013.01); *G08G 1/205* (2013.01); *B60R 2021/0027* (2013.01)

(56) References Cited

U.S. PATENT DOCUMENTS

| | | | | |
|---|---|---|---|---|
| 2008/0252444 A1* | 10/2008 | Batot | ............... | G08G 1/205 340/539.13 |
| 2008/0269993 A1* | 10/2008 | Simpson | ............. | B60R 21/0132 701/45 |
| 2009/0092284 A1* | 4/2009 | Breed | ............... | B60J 10/00 382/103 |
| 2009/0210114 A1* | 8/2009 | Baumann | ............ | B60R 21/0132 701/45 |
| 2011/0124311 A1* | 5/2011 | Stahlin | ............... | G08B 25/016 455/404.2 |
| 2014/0187191 A1* | 7/2014 | Mader | ................ | G08G 1/205 455/404.1 |
| 2014/0195070 A1* | 7/2014 | Shimizu | ............... | G07C 5/0841 701/1 |
| 2015/0127212 A1* | 5/2015 | Chacon | ............... | B60R 21/013 701/32.4 |
| 2015/0127229 A1* | 5/2015 | Goraya | ............... | B60W 30/04 701/50 |
| 2015/0158447 A1* | 6/2015 | Nonaka | ............... | B60R 21/015 340/436 |
| 2015/0246654 A1* | 9/2015 | Tadic | .................. | B60W 40/09 340/436 |
| 2015/0356864 A1* | 12/2015 | Hutchings | ........ | G08G 1/096791 348/148 |

OTHER PUBLICATIONS

ShockWatch, Smart Solutions for Safe Transit, https://shockwatch.com (last visited Nov. 19, 2015).

Delphi Safety Products, http://delphi.com/manufacturers/cv/safety/ (last visited Nov. 19, 2015).

* cited by examiner

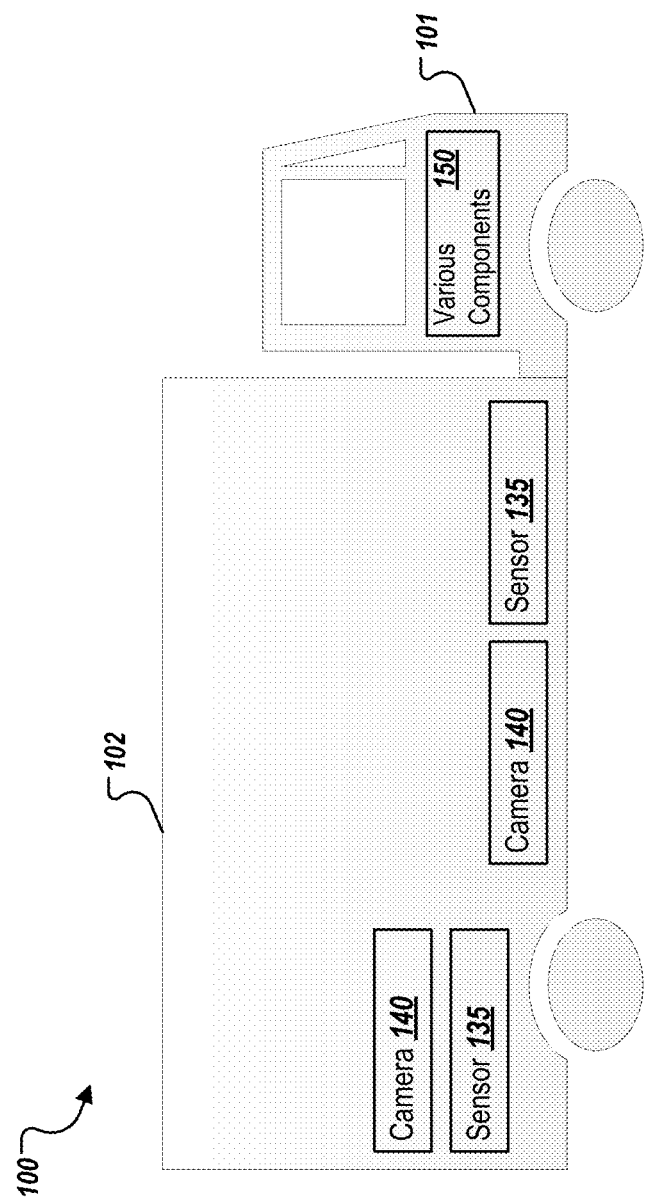

VEHICLE IMPACT SENSOR AND
NOTIFICATION SYSTEM

CLAIM OF PRIORITY

This application claims priority under 35 USC §120 to U.S. patent application Ser. No. 14/946,257, filed on Nov. 19, 2015; and under 35 USC §119(e) to U.S. Provisional Patent Application Ser. No. 62/123,571, filed on Nov. 20, 2014, the entire contents of both are hereby incorporated by reference.

TECHNICAL FIELD

The present disclosure relates to systems of sensors and controllers for detecting impacts and proximity alerts to a monitored vehicle and generating records of the impacts for notification purposes to the operator of the vehicle and to interested or assistive third parties.

Thousands of people die in accidents with semi-trucks each year in the United States. Countless more people are involved in non-fatal accidents each year as well, with some estimates reaching up to 500,000 accidents when vehicles collide with other vehicles or pedestrians. When counting all types of vehicles, the Insurance Institute for Highway Safety estimates in 2013 over 30,000 motor vehicle deaths occurred with many additional non-fatal accidents. Common causes of accidents include driver tiredness and fatigue, poor maintenance, poor or faulty driving, distracted driving, and technical/mechanical malfunctions (e.g., brake issues, tire blowouts, etc.).

Further, as reported by the National Highway Traffic Safety Administration, the number of fatal hit-and-run crashes is trending upward, from 1,274 in 2009, to 1,393 in 2010, to 1,449 in 2011. Similar analyses of all hit-and-run crashes have found that about one in five of all pedestrian fatalities are hit-and-runs, and 60% of hit-and-run fatalities have pedestrians as victims. The number of non-fatal hit-and-runs are significantly higher.

SUMMARY

The present disclosure involves systems, software, sensors, and applied solutions for detecting incidents associated with a vehicle, where sensors associated with the vehicle identify impacts or proximity alerts to other vehicles and objects and record information related to those detected incidents. The recorded information can be immediately communicated to interested parties of the person or entity (e.g., emergency responders, personal contacts, business contacts, etc.) associated with the vehicle, or alternatively, stored for provision or inspection at the vehicle and reviewed at an intermediate or end destination along the vehicle's route.

In one example method, operations include detecting an incident associated with a monitored vehicle, where detecting the incident comprises receiving an alert from at least one sensor associated with the vehicle, identifying a location of the vehicle in response to the detection, and storing a record of the detected incident, where the record includes the identified location of the vehicle and a time associated with the detected incident.

In some instances, the method may further include providing an indication of the detected incident to a driver of the monitored vehicle. The indication of the incident may include one or more of the following, a notification light within the vehicle, a notification display on a graphical user interface associated with the vehicle, and a notification sound played within the vehicle.

In some instances, the method may include, in response to detecting the incident, sending instructions to at least one camera associated with the vehicle to capture an image. In some instances, the at least one camera and the at least one sensor may be a single device. Additionally and/or alternatively, the cameras associated with the vehicle can be located proximate to the at least one sensor from which the alert is received.

In some instances, the monitored vehicle includes a plurality of sensors. The plurality of the sensors may be attached to or embedded on the monitored vehicle. In some instances, the plurality of sensors can include at least one impact sensor, where the at least one impact sensor detects an impact to the monitored vehicle. In some instances, the at least one impact sensor can detect information related to the impact to the monitored vehicle, including at least a force of the detected impact. The detected information may be included in the alert received from the at least one sensor, and the method may further includes determining a severity level of the impact based at least in part on the detected information received from the at least one sensor. In response to determining that the severity of the impact exceeds a severity threshold, the method can identify at least one party to notify of the impact and automatically send a notification of the impact to the at least one identified party. In some instances, the at least one identified party may be an emergency responder, such that automatically sending the notification of the impact to the at least one identified party includes sending an emergency response request to the emergency responder, the request including the location of the incident and at least a portion of the detected information. When the vehicle is transporting a shipment, the at least one identified party may comprise a party to the shipment, where automatically sending the notification of the impact to the at least one identified party includes sending an incident notification to the party to the shipment. Further, for impacts exceeding the severity threshold, actions of the vehicle may be monitored for a period of time after the detected impact. In response to determining that the vehicle has not stopped within the period of time after the detected impact, the operations of the vehicle can be reduced, which may include causing the vehicle to reduce its driving capabilities and stopping the vehicle.

In some instances, the plurality of sensors can include at least one proximity sensor, where the at least one proximity sensor detects an object or vehicle nearing the monitored vehicle within a predetermined distance and triggers a proximity alert in response to the detection. The at least one proximity sensor can detect information related to the detection of the object or vehicle nearing the monitored vehicle, where the detected information includes information associated with the proximity alert. The detected information may be included in the alert received from the at least one sensor, with the method further including determining, within a predetermined period of time, a plurality of received proximity alerts. In response to determining that number of received proximity alerts exceed an alert threshold, at least one party can be identified to notify of the plurality of received proximity alerts, and a notification of the plurality of received proximity alerts can be automatically sent to the at least one identified party. Further, in response to determining that the number of received proximity alerts exceed the alert threshold, reducing operations of the vehicle.

While generally described as computer-implemented software embodied on tangible media that processes and transforms the respective data, some or all of the aspects may be computer-implemented methods or further included in respective systems or other devices and vehicles for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 1A and 1B are illustrations of a vehicle where an example implementation of the system and associated methods are used.

DETAILED DESCRIPTION

Figure 1A:
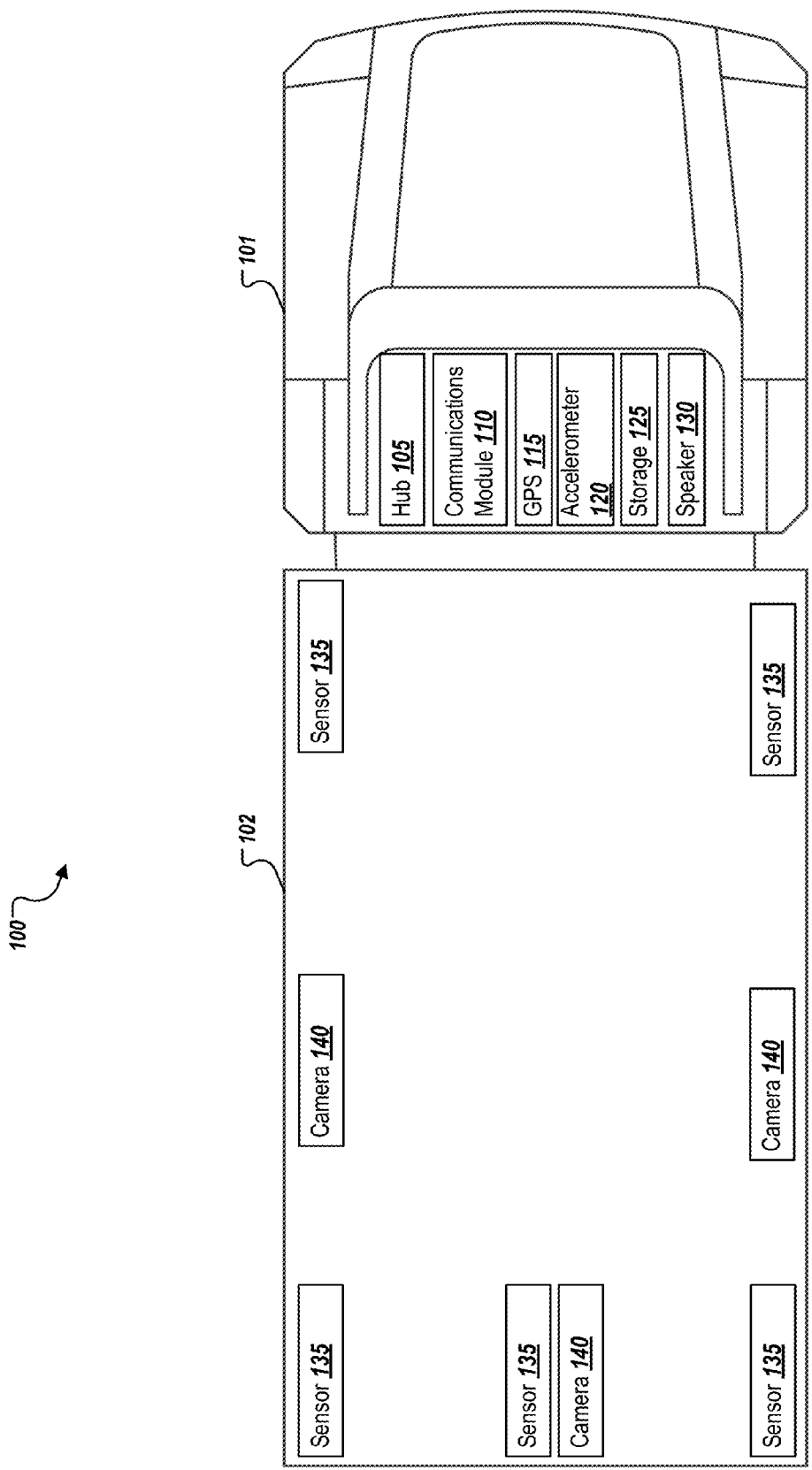

Vehicles of all types are involved in accidents and close calls each day. Drivers of the vehicles may be at fault or may be the victim of another driver or a combination of factors. In most instances, the drivers of the vehicles involved in a collision or a significant near-miss stop and render aid, where needed, or to exchange insurance information and evaluate damage. Today, in serious incidents, emergency personnel may be alerted by receiving calls from mobile devices of the drivers, passengers, or witnesses to the incident. However, in some instances, drivers of one or more of the vehicles may not be aware of an impact or incident due to a seemingly minor impact, due to distracted driving or impairment, due to loud music or difficult driving conditions, or due to an effort to flee the scene without stopping. The present solution offers a system and methods that can be implemented to ensure that incidents, including impacts and near-misses, are captured by a smart system and, where appropriate, are immediately reported to interested parties associated with a particular vehicle.

An example situation where such a system provides a great solution is on the nation's highways, particularly those where less traffic may result in fewer witnesses to incidents. By using the smart system described herein, information associated with the incident can be immediately recorded such that a record of the impact or near-miss is kept and made available without needing additional parties to report the incident. A notification of the incident may be provided to the vehicle's inhabitants, such as a driver and/or passenger, particularly where the incident may be otherwise difficult to identify or determine the occurrence thereof.

In some instances, the record may be stored at the vehicle until an event occurs, where the information can then be transmitted or communicated to a third party. The event triggering the communication may be reaching a particular final or intermediate destination, receiving a request for the information, or another suitable event. In some instances, the communication may be immediately after the occurrence of the incident, such as in response to a determination that the incident was of a particular severity or that a particular incident (or series of incidents) had occurred. In those instances, the communication may be made by any suitable communication medium or means, including to a relatively remote recipient. One benefit of such automatic communications is that little to no delay in notifying interested parties will occur. Particularly where an incident is a crash, wreck, or other collision, the communication may be sent to nearby emergency responders such that an immediate emergency response, where necessary, can be triggered. In the case of potential hit-and-runs, or where drivers are unaware of a collision or collision that they caused, the smart system may allow or cause driving operations of the vehicle to be limited so that the driver can stop and render aid and/or report to police or the other driver, as appropriate.

FIGS. 1A and 1B are illustrations of a vehicle 100 where an example implementation of the system and associated methods are used. While the vehicle 100 illustrates a semi-trailer truck, the vehicle 100 may be any type of suitable vehicle, including cars (e.g., sedans, coupes, convertibles), pick-up trucks, station wagons, vans, sports utility vehicles (SUVs), motorcycles, and other suitable motor vehicles. Further, the components of FIGS. 1A and 1B may be located in different positions on the vehicle 100 as compared to those illustrated. The illustration of FIG. 1 is meant to be an illustrative example—variations and optimizations will be appropriate for each implementation.

As illustrated in FIGS. 1A and 1B, the described system may be separated into a serious of components located within the vehicle 100 (i.e., at the cab 101) and those located peripheral to the vehicle 100, and in particular, to the trailer 102. For example, as illustrated, a hub 105, communications module 110, global positional system (GPS) 115, accelerometer 120, computer storage medium 125, and a speaker 130 (collectively illustrated as the various component 150 in FIG. 1B) are illustrated as within the cab of vehicle 100. At least some of these components may be located elsewhere on the vehicle 100, such as the GPS 115 and accelerometer 120, among others. The hub 105 may be a receiver and controller associated with the various components collecting data related to potential incidents, including the various sensors 135 and cameras 140 on the trailer of the vehicle 100. The hub 105 may further manage and operate the communications module 110, may communicate with the GPS 115, and may monitor information associated with and generated by the accelerometer 120. Further, incident information may be stored in the computer storage medium 125. Additionally, settings associated with the operations of the smart system may be stored in the computer storage medium 125, including one or more operations and/or computer programs or instructions defining how the hub 105 is to perform. In some instances, the computer storage medium 125 may store communication contacts associated with the vehicle 100, which the hub 105 may access and use to contact via the communications module 110. Speaker 130 may be a part of an audio system within the vehicle 100, or it may be a separate speaker 130 associated specifically with the hub 105. When a notification of an incident is identified, the speaker 130 may verbally notify the driver and any passengers of the incident. Further, while not illustrated in FIGS. 1A and 1B, the hub 105 may be associated with a display or other graphical user interface (GUI), which can provide additional information regarding any incidents to the driver and passengers. For example, the display may be able to show where impacts or proximity alerts were triggered or have occurred on an illustration or outline of the vehicle. Other presentations notifying the driver and passengers of a potential incident can be provided.

The sensors 135 may be any suitable impact and/or proximity sensors, including a combination thereof. Impact sensors may be used to determine when an impact to the vehicle 100 or its trailer 102, including by another vehicle, an object in the road (e.g., a tree, a sign, a column, etc.). The impact sensors may be able to detect a magnitude of a force associated with the impact, as well as an impact associated therewith. In some instances, the information observed by the impact sensors may be combined with data from the accelerometer 120 to accurately gauge the impact. In some instances, the impact sensors may include their own accelerometers to provide readings of the force and direction of the impact. When an impact is identified or monitored, the impact sensors can provide a notification of the impact and its details to the hub 105.

Proximity sensors may be used in addition to or in lieu of the impact sensors, and may be used to detect the presence of a nearby object (e.g., a vehicle) without physical contact. The proximity sensors can be used to determine if one or more vehicles has approached within a particular range of the vehicle 100. The proximity sensors may be any suitable types of sensor, and can include capacitive sensors, capacitive displacement sensors, Doppler effect sensors, laser rangefinder sensors, inductive sensors, optical sensors, radar sensors, and other suitable sensor types. Specifically, the proximity sensors are able to determine when a proximity threshold is violated with respect to the vehicle 100 and can provide a notification of such proximity alerts to the hub 105.

One or more cameras 140 may be placed on or be associated with the vehicle 100 and, for example, its trailer 102. The cameras 140 may be passive or active, where the active cameras capture images and/or video on a regular basis. Passive cameras may only capture images and/or video in response to an impact and/or a detected proximity alert. The cameras 140 may be triggered by the sensors 135 themselves, such that in response to particular impacts or proximity alerts the sensors 135 cause the camera(s) to activate and capture an image or video at the time of the alert. In other instances, the sensors 135 may send their data to the hub 105, which in turn sends an instruction for the camera(s) 140 to capture an image and/or video. The cameras 140 may be associated with a particular angle or view, where the angle or view is not changed. For example, a camera 140 located on the back of the trailer 102 may be capable only of capturing images or video directly behind the trailer 102. Similarly, cameras 140 located on the side of the trailer 102 may capture images or video associated with events occurring on the side of the trailer 102. The images or video captured by the cameras 140 can be added to a record associated with the impact or proximity alert stored within the storage medium 125, and can allow for additional information to be added to the record. The image and/or video information may be used to identity the other vehicles involved in an incident, witnesses to an incident, or additional location or situational information associated with the incident, including weather information, visibility information, road condition information, and other data. That data can later be used to assist in investigations into the incident, including determining the liable drivers or vehicles.

As illustrated in FIG. 1A, the sensors 135 and cameras 140 may be located at a periphery of the vehicle 100, and as illustrated, may be limited to the trailer 102. In other instances, the sensors 135 and cameras 140 may be located at or around the cab 101. In some instances, one or more cameras 140 may be located within the cab 101, such that images or video of the driver and/or passenger can be taken in response to an impact or proximity alert. As illustrated in FIG. 1B, the sensors 135 and cameras 140 may be at various heights or locations at the vehicle 100. The sensors 135 and/or the cameras 140 may be attached in any suitable manner, including using a magnet-based or magnetic connection to the trailer 102 and vehicle 100. Alternatively, the sensors 135 and/or the cameras 140 may be attached via screws, Velcro, or other mounts or attachments, as appropriate. In some instances, the sensors 135 and/or the cameras 140 may be placed at a level on the vehicle 100 at which an impact may be likely. The sensors 135 and cameras 140 may be located near or next to each other in some instances, where in others they may be located separately or otherwise apart from one another. The camera 140 or cameras 140 may be placed to allow the best viewing angle or angles of the environment around the vehicle 100, which may differ from model to model. In some instances, the sensors 135 may be placed near running lights of the vehicle 100, underneath the trailer 102 (where appropriate), at corners of the trailer 102 or vehicle 100, or elsewhere. The sensors 135 and/or the cameras 140 may be connected to the hub 105 via a wired or wireless connection (e.g., wi-fi, Bluetooth, etc.), allowing for the data obtained by them to be passed to the hub 105 easily and quickly. While FIG. 1B illustrates the various components 150 as all located in the cab 101, some or all of the components 150 may be located elsewhere.

Figure 2:
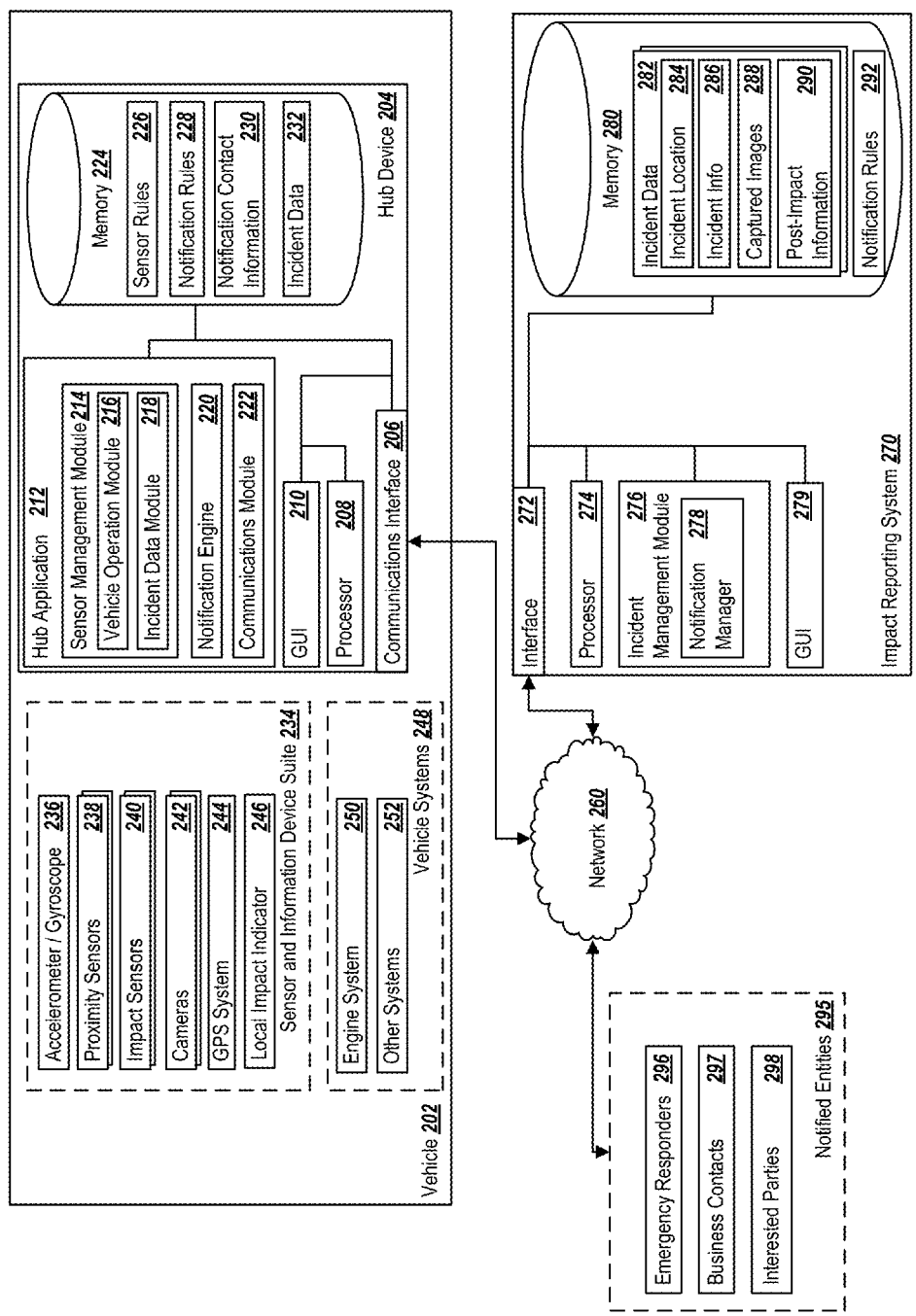
FIG. 2 is a block diagram illustrating an example system for detecting and reporting notifications of incidents occurring with a particular vehicle.

FIG. 2 is a block diagram illustrating an example system for detecting and reporting notifications of incidents occurring with a particular vehicle. As illustrated in FIG. 2, system 200 includes components located locally at vehicle 202 as well as components located remote from the vehicle 202. Some of the illustrated components may be present in some implementations and absent in others, while additional or alternative components may also be included in alternative implementations. As illustrated, the system 200 may be represented as a first system represented by the vehicle 202 and one or more systems or components external to the vehicle 202. The vehicle 202 may represent any suitable motor vehicle. Further, the vehicle 202 may include components specific to the described solution as well as components associated with the mechanical and electrical operations of the vehicle 202 itself. The components associated with the standard operations of the vehicle 202 are identified as vehicle systems 248, which may include the engine system 250 and other systems 252, which may include various internal systems from climate control to entertainment systems, as well as braking systems and electronic functions. In some instances, the vehicle systems 248 may be controlled or affected by the hub device 204 and its hub application 212 as described herein. In general, although components are shown individually, in some implementations, functionality of two or more components, systems, or servers may be provided by a single component, system, or server.

As used in the present disclosure, the term "computer" is intended to encompass any suitable processing device, including those portions of a computer used by or operating within the vehicle 202 and its onboard systems. For example, the hub device 204 and the impact reporting system 270, as illustrated, may be any computer or processing device such as, for example, a blade server, general-purpose personal computer (PC), Mac®, workstation, UNIX-based workstation, or any other suitable device, including an Arduino-powered device, a Raspberry Pi-powered device, among others. Moreover, although FIG. 2 illustrates the hub device 204 and the related sensor and information device suite 234, either can be implemented using two or more systems, multiple components, as well as other suitable computers. In other words, the present disclosure contemplates computers other than general purpose computers, as well as computers without conventional operating systems. In general, these illustrated components may each be adapted to execute any operating system, including Linux, UNIX, Windows, Mac OS®, Java™, Android™, or iOS. According to one implementation, the illustrated systems may also include or be communicably coupled with a local server or workstation capable of communicating with a plurality of other systems, both local and remote.

In general, the hub device 204 is used to manage and control operations of based on information received from the sensor and information device suite 234. Those operations may include, in some instances, controlling operations of the vehicle 202, including engine system 250 and other systems 252, such as a braking system. In general, the hub device 204 may be a device embedded within, associated with, or part of the vehicle 202 and its onboard computers, or it may be a separate and standalone device operable to connect and communicate with the components including in the sensor and information device suite 234, as well as one or more external systems, when appropriate. The hub device 204 may be a separate tablet or mobile computing device stored or maintained within the vehicle 202, as well as an embedded computer (e.g., embedded within the dashboard or heads-up (HUD) display of the vehicle 202.

As illustrated, the hub device 204 includes a communications interface 206, a processor 208, a GUI 210, a hub application 212, and memory 224. The hub device 204, via the communications interface 206, may connect directly or indirectly to various components or systems within the vehicle 202 (e.g., vehicle systems 248 or the components associated with the sensor and information device suite 234), as well as systems external to the vehicle 202, including the impact reporting system 270 and/or a set of notified entities 295.

The communications interface 206 is used by the hub device 204 for communicating with other systems in a local and/or distributed environment—including within the environment 100—connected to the network 260, e.g., local systems at the vehicle, the notified entities 295, and the impact reporting system 270, among others, as well as other systems communicably coupled to the network 260. Generally, the communications interface 206 comprises logic encoded in software and/or hardware in a suitable combination and operable to communicate with the network 260 or via the internal connections and communication paths within the vehicle 202. More specifically, the interface 206 may comprise software supporting one or more communication protocols associated with communications such that the network 260 or interface's hardware is operable to communicate physical signals within and outside of the illustrated vehicle 202. Still further, the communications interface 206 may allow the hub device 204 to create ad hoc or dedicated connections to one or more of the internal components or systems, where appropriate.

Network 260 facilitates wireless or wireline communications between the components of the environment 200 (e.g., both within and outside vehicle 202), as well as with any other local or remote computer, component, or systems, as well as systems or computers external to the vehicle 202 that are communicably coupled to network 260, including those not illustrated in FIG. 2. In the illustrated environment, the network 260 is depicted as a single network, but may be comprised of more than one network without departing from the scope of this disclosure, so long as at least a portion of the network 260 may facilitate communications between senders and recipients. In some instances, one or more of the illustrated components (e.g., the impact reporting system 270) may be included within network 260 as one or more cloud-based services or operations. The network 260 may be all or a portion of an enterprise or secured network, while in another instance, at least a portion of the network 260 may represent a connection to the Internet. In some instances, a portion of the network 260 may be a virtual private network (VPN). Further, all or a portion of the network 260 can comprise either a wireline or wireless link. Example wireless links may include 802.11a/b/g/n, 802.20, WiMax, LTE, Bluetooth, near-field communication (NFC), and/or any other appropriate wireless link. In other words, the network 260 encompasses any internal or external network, networks, sub-network, or combination thereof operable to facilitate communications between various computing components inside and outside the illustrated environment 200. The network 260 may communicate, for example, Internet Protocol (IP) packets, Frame Relay frames, Asynchronous Transfer Mode (ATM) cells, voice, video, data, and other suitable information between network addresses. The network 260 may also include one or more local area networks (LANs), radio access networks (RANs), metropolitan area networks (MANs), wide area networks (WANs), all or a portion of the Internet, and/or any other communication system or systems at one or more locations. In some instances, the network 260 may provide local communications between the hub device 204 and the components and systems within the vehicle 202, including via hard-wired communication paths.

As illustrated in FIG. 2, the hub device 204 includes a processor 208. Although illustrated as a single processor 208 in FIG. 1, two or more processors may be used according to particular needs, desires, or particular implementations of the hub device 204. Each processor 208 may be a central processing unit (CPU), an application specific integrated circuit (ASIC), a field-programmable gate array (FPGA), or another suitable component. Generally, the processor 208 executes instructions and manipulates data to perform the operations of the hub application 212 and its associated functionality. Specifically, the processor 208 executes the algorithms and operations described in the illustrated figures, including the operations performing the functionality associated with the hub device 204 generally, as well as the various software modules (e.g., the hub application 212), including the functionality for sending communications to and receiving transmissions from the local components and systems (e.g., the vehicle systems 248 and the sensor and information device suite 234), the impact reporting system 270, and the notified entities.

The hub device 204 also includes memory 224, or multiple memories 224. The memory 224 may include any memory or database module and may take the form of volatile or non-volatile memory including, without limitation, magnetic media, optical media, random access memory (RAM), read-only memory (ROM), removable media, or any other suitable local or remote memory component. In some instances, memory 224 may be a local removable storage device, such as a secure digital (SD) card (or similar) or a hard drive where data records associated with one or more incidents are recorded locally. In general, memory 224 may store various objects or data, including rules, operational instructions, contact information, administrative settings, password information, caches, applications, backup data, and any other appropriate information including any parameters, variables, algorithms, instructions, constraints, or references thereto associated with the purposes of the hub device 204. Additionally, the memory 224 may store any other appropriate data, such as a security or access log, reporting files, and others. As illustrated in FIG. 2, memory 224 can store a set of sensor rules 226, a set of notification rules 228, notification contact information 230, and incident data 232.

Sensor rules 226 can be used to identify various sensors and determine how and when sensor data is tracked and acted upon. In some instances, the sensor rules 226 may include rules related to one or more cameras 242 and other components that define actions to be taken when sensors (e.g., proximity sensors 238 and/or impact sensors 240) determine an incident has occurred. The sensor rules 226 can define a set of information to be captured related to a particular incident, including but not limited to a date and time of the incident, a location of the incident, and impact or proximity alert information, among others. In some instances, the sensor rules 226 may define a set of rules that determine one or more actions to be taken in response to detected incidents, including instructions to provide notifications to the driver of the vehicle 202 (e.g., a warning light or other local impact indicator 246, including speakers), to provide or trigger notifications to $3^{rd}$ parties, or to modify operations of the vehicle 202 or other vehicle systems 248, among others. In some instances, the sensor rules 226 may be dependent on both the type and severity of the sensor input received. For example, if the sensor input represents one proximity alert, only a local notification to the driver of the vehicle 202 may be needed. However, if multiple proximity alerts occur during a particular period of time, local notifications may be made, notifications to at least one external source (e.g., a local police station) may be made, and/or operations of the vehicle 202 may be reduced (e.g., braking may be applied with a notification to the driver that the vehicle 202, upon leaving the road, will be turned off for a period of time).

The sensor rules 226 may be used in combination with the notification rules 228. In some instances, the notification rules 228 may be included within or a part of the sensor rules 226 or an alternative rule set. The notification rules 228 are used to determine how notifications should be generated in response to sensor input. At least some of the notification rules 228 may be modified for various trips or occasions, depending on the reason or purpose of the current trip, as well as the parties to the trip. For example, if the system is associated with a truck that constantly carried freight, the notification rules 228 may be modified for each trip associated with different parties. The notification rules 228 may include escalating notification options based on the type and severity of impact. For example, a simple collision such as a very minor bump (i.e., based on the impact data determined by an impact sensor 240) may include a notification to the driver and a stored notification for communication at a later date. A more severe collision (i.e., based on the force of the impact) may cause emergency services to be automatically contacted. The notification contact information 230 can be used to determine who should be contacted in accordance with the notification rules 228, including telephone numbers, email addresses, and other communication methods. The contact information 230 may include numbers to emergency responders, business contacts 297 (e.g., that are related to a shipment or associated with the vehicle 202), and other interested parties 298, such as those identified by the driver of the vehicle or otherwise interested in the information. Regarding emergency responders 296, the contact information may not be for a specific emergency responder, but rather a rule set that allows the closest or most relevant emergency responders to be identified and contacted. In some instances, the emergency responders along a pre-planned route may be identified, with the correct emergency responder identified based on a determined location of the incident.

Incident data 232 can store information related to one or more incidents encountered by the vehicle 202 during a current and, in some cases, one or more prior, trips. The incident data 232 can be populated by the hub application 212 and its individual components based on data received from the sensor and information device suite 234, as well as other locations. An example incident data record may include information associated with a timestamp of the determined incident, location information obtained from a GPS system 244, and information collected from the reporting sensor (e.g., proximity sensors 238, impact sensors 240, a separate accelerometer 236, etc., providing information related to the incident). Additionally, information regarding the vehicle 202 from prior to and after the incident may be captured, including prior speeds, prior alerts, actions taken after the incident, and others. The incident data 232 can be stored locally and/or communicated to one or more remote locations or addresses, including an impact reporting system 270 and/or one or more notified entities 295, among others. In some instances, the incident data 232 can be used locally at the vehicle 202 to determine next operations for the hub application 212, including whether operations of the vehicle systems 248 should be altered automatically based on the incident data 232 and the sensor rules 226.

The GUI 210 of the hub device 204 interfaces with at least a portion of the environment 200 for any suitable purpose, including generating a visual representation of a Web browser and/or the hub application 212. In particular, the GUI 210 may be used to view and navigate various screens and presentations related to the hub application 212, as well as Web pages related or not related to the vehicle 202. The GUI 210 may present interactive presentations and displays allowing information related to the hub application 212 to be shared with the driver of the vehicle 202, including notifications of incidents, presentations of specific incident data 232, and information on one or more notifications that could be made by the hub application 212. Generally, the GUI 210 provides the driver and passenger with an efficient and user-friendly presentation of data provided by or communicated within the system. The GUI 210 may comprise a plurality of customizable frames or views having interactive fields, pull-down lists, and buttons operated by the driver, or user, of the hub device 204. For example, the GUI 210 may provide interactive elements that allow a user to view or interact with information related to the operations of the process associated with one or more incidents. In some instances, particular settings associated with the hub application 212 (e.g., particular rules or contact information) may be modified via the GUI 210. The GUI 210 may be capable of receiving instructions from the driver or passenger via a corresponding display (e.g., via dial, button, touch, or gesture input, etc.), or via voice commands or interactions. The GUI 210 may present information associated with the hub application 212 for viewing and interaction at the hub device 204. In general, the GUI 210 is often configurable, supports a combination of tables and graphs (bar, line, pie, status dials, etc.), and is able to build real-time portals and presentations, where tabs are delineated by key characteristics (e.g., site or micro-site). Therefore, the GUI 210 contemplates any suitable graphical user interface, such as a combination of a generic web browser, intelligent engine, hub-specific presentation, and/or command line interface (CLI) that processes information in the hub device 204 and efficiently presents the results to the user visually. In some instances, the GUI 210 may be used for general displays and interactions with the vehicle 202 for functions and options unrelated to the sensors 238, 240 and notification system.

As illustrated, the hub device 204 includes the hub application 212. The hub application 212 represents an application, set of applications, software, software modules, or combination of software and hardware used to manage the impact and proximity sensor system and corresponding actions taken in response to sensor input (e.g., collisions, proximity warnings, and other incident-related events). In the illustrated solution, as described above, the hub device 204 is shown as a single system. In many implementations, the hub device 204 may be a set of related, remote, or individual components and/or applications used to perform the described functionality of the single hub device 204. In general, the hub device 204 is used to communicate with and manage the various sensors and other associated components in a vehicle 202 in which an impact and incident monitoring system is present. In the illustrated example, the hub device 204 uses the hub application 212 to perform and manage this functionality.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, the hub application 212 includes a sensor management module 214, a notification engine 220, and a communications module 222. The sensor management module 214 manages the various sensors included or associated with the vehicle 202, namely the sensor and information device suite 234. The sensor management module 214 can be used to update and modify settings associated with each of the sensors, including a sensitivity level of the sensors, an active or passive setting for the sensors, as well as other suitable parameters and functions. The sensor management module 214 may be able to manage one or more non-sensor components, such as one or more cameras 242 associated with the vehicle 202. In response to incident information being received by the various sensors, the sensor management module 214 can, based on the sensor rules 226, determine whether one or more cameras 242 should be activated to take a photo or video in response to the incident identified by the sensors. Additionally, the sensor management module 214 can determine whether already captured information from the cameras 242 should be accessed and associated with the incident data 232 being collected. The sensor management module 214 can take information from the sensors, along with other relevant information (e.g., location from the GPS system 244, timestamp from a system time, etc.) and include the information into the incident data 232. In some instances, the incident data module 218 of the sensor management module 214 can perform the collection of relevant data from the sensor and information device suite 234, as well as any other suitable location. The vehicle operations module 216 can, based on the sensor rules 226 and the collected incident data, determine whether one or more of the vehicle's operations may be need to be modified in response to the incident. The vehicle operation module 216 can consider one or more factors to determine the operations to be performed or modified by the vehicle systems 248, including the type of incident, the severity of the incident (e.g., the force of the impact, the location of the impact on the vehicle, etc.), the actions of the driver after the incident has occurred (e.g., whether the driver has slowed or stopped the vehicle 202 after the incident where a collision occurs), the number of incidents in a predetermined time period (e.g., where multiple near misses from proximity alerts have been identified), as well as other relevant factors. In some instances, the relevant factors and corresponding actions can be included in the sensor rules 226 or another suitable rule set. Based on these determinations, the vehicle operation module 218 can send instructions to one or more vehicle systems 248, including the engine system 250, braking system, or any other system 252 of the vehicle as determined by the rule set.

The notification engine 220 of the hub application 212 determines, based on the incident data received, the notification rules 228, and the notification contact information 230, when and how to notify persons or entities regarding particular incidents. As noted, the notification rules 228 may define varying levels of communications and notifications based on the incident-specific information, from simply notifying the driver of a proximity alert to communicating with one or more external entities or persons in the event of an impact, crash, or other incident. In some instances, the notification may be held until the vehicle 202 arrives to a particular location (e.g., an end or intermediate destination). The notification engine 220 may initiate the notification and communicate the relevant information as determined by the notification rules 228, which may include some or all of the incident data 232 for a particular incident. In some instances, information on multiple instances may be communicated at once, such as when incidents are stored locally until the vehicle 202 arrives at a particular location. The notification engine 220 may also manage notifications provided to the driver and passengers of the vehicle 202, including by initiating or interacting with one or more local impact indicators 246. The local impact indicators 246 may include lights, displays, speakers, physical feedback (e.g., vibration to steering wheel or seat as a notification), or other suitable components or indicators that provide an indication of an incident or impact to the persons inside the vehicle 202.

The communications module 222 allows the hub application 212 and its components to communicate with one or more internal systems or components and/or external systems. In some instances, the communications module 222 may format information to be sent to particular locations prior to sending said information. The communications module 222 can interact with and use the communications interface 206 to send wired or wireless communications within and outside of the vehicle 202, as appropriate.

As described, the vehicle 202 includes a sensor and information device suite 234. While illustrated together, one or more of the illustrated components within the suite 234 may be present prior to the installation of the smart system or may be used for purposes other than smart system. For example, one or more of the cameras 242 (e.g., a rear camera used for parking assistance) may be a part of the vehicle 202 regardless of the smart system's installation. Additionally, the GPS system 244 may be a standard GPS provider included as an option in the vehicle, or may be a third-party system providing GPS information to the driver (e.g., from a mobile device or dedicated GPS system).

The proximity sensors 238 may be any suitable sensor for determining a proximity alert within a particular range of the vehicle 202 in a range of view or angles form where the individual proximity sensors 238 are installed. In some instances, particular proximity sensors 238 used may include a range of three-fourths of an inch (¾") or less to 16 feet (16') or more. The proximity sensors 238 may be associated with a threshold distance at which proximity alerts are triggered and reported to the hub device 204.

The impact sensors 240 may be any suitable sensor for determining an impact based on a measured force or movement associated with an outside object (i.e., another vehicle or object). The impact sensors 240 may be active or passive sensors. In some instances, a combination of proximity sensors 238 and impact sensors 240 may be used, where the impact sensors 240 remain in standby until the proximity sensors 238 determine another vehicle or object is within a predetermined range from the vehicle 202. The impact sensors 240 may be used to determine when an impact to the vehicle 202 occurs. The impact sensors 240 may be able to detect a magnitude of a force associated with the impact, as well as a direction of the impact associated therewith. When an impact is identified or monitored, the impact sensors 240 can provide a notification of the impact and its details to the hub device 204.

The accelerometer and/or gyroscope 236 can detect motions including sudden stops, tilts, sudden lane switches and/or swerves, and any other movements. In some instances, one or more accelerometers and/or gyroscopes 236 may be built into or associated with particular sensors 238, 240. Information from the accelerometer and/or gyroscope 236 can be combined with information from the other sensors 238, 240 to provide additional information on a particular incident or potential incident.

As previously noted, camera(s) 242 may include any suitable camera capable of capturing images and/or video, and may be incorporated into particular sensors 238, 240 or may be separate from those sensors. In some instances, the cameras 242 may be activated in response to an incident being detected, while in others, the cameras may capture images and/or video, with images or video captured at the time of the detected incident being incorporated into the incident data 232. The cameras 242, like the sensors 238, 240, can be attached to or placed at various locations around the vehicle 202 such that incidents around a portion of the vehicle 202 can be captured as they occur. Various orientations may be used in an effort to cover as much of the vehicle 202 as possible.

The impact reporting system 270 represents a reporting system for incidents external to the vehicle 202 and its hub device 204. In some instances, incident data 232 recorded by the hub device 204 and hub application 212 can be sent to and/or stored at the impact reporting system 270. In some instances, the impact reporting system 270 may be included as a recipient with whom the notification rules 228 indicate incident data should be shared, either immediately in response to the incident being detected or at a later time (e.g., upon reaching a particular destination). The impact reporting system 270 may be a centralized system (e.g., a cloud-based system) such that incident data from multiple vehicles are stored there, while in others, the impact reporting system 270 may be associated with a particular location (e.g., a weigh station, shipping yard, etc.) where vehicles stop and interact with the system. The hub device 204 can communicate with the impact reporting system 270 via wired or wireless (e.g., Bluetooth, NFC, Internet-based communications, etc.) connections via the communications interface 206 of the hub device 204 and interface 272 of the impact reporting system 270. The interface 272 may be similar to or different from the interface 206, and can allow the impact reporting system 270 to communicate with network 260 and other communicably connected systems, including the hub device 204.

The impact reporting system 270 also includes a processor 274, an incident management module 276, and memory 280. Processor 274 may be similar to or different than processor 208, and execute instructions and manipulate data to perform the operations of the impact reporting system 270. In particular, the processor 274 can execute the incident management module 276. The incident management module 276 can perform operations associated with receiving, analyzing, and presenting information associated with one or more incidents received from hub devices 204 associated with one or more vehicles 202. In some instances, the impact reporting system 270 may act as a relay to one or more third parties from the hub device 204, such as where the hub device 204 may not have the capability to remotely connect to the Internet while on the road. In some instances, the impact reporting system 270 may be associated with an owner or manager of the vehicle 202 and other vehicles, such that reports from a fleet of vehicles can be maintained at a single location.

The incident management module 276 can receive incident data (e.g., incident data 232 from the hub device 204) and store that information in memory 280 (similar to or different from memory 224) and store in a collected incident data 282 database or entry. Multiple incidents can be maintained in the incident data 282, with each incident associated with specific information, including an incident location 284, incident information 286, captured images 288 associated with the incident, and post-incident information 290 (e.g., whether driver stopped, kept driving, etc.). Memory 280 may also include notification rules 292, which may be similar to notification rules 228, and provide information on how received incidents are to be reported. While not illustrated, the notification rules 292 may also include or reference one or more sets of contact information for persons or entities to be notified according to the rules. The notification manager 278 of the incident management module 276 can execute those rules, allowing the impact reporting system 270 to notify interested parties or entities.

Notified entities 295, as described, may include any persons or entities associated with the vehicle 202, and whom the notification engine 220 or notification manager 278 provide a notification to in response to identifying or detecting an incident. The notified entities 295 may include emergency responders 296 or other emergency personnel, including the police, fire departments, and hospitals. The entities 295 may also include one or more business contacts 297 associated with the vehicle 202, including an owner of the vehicle 202 or company associated with the vehicle 202, a company or other entity associated with a shipment being delivered by the vehicle (e.g., a sender or receiver of the cargo), or another person with a business interest in the vehicle 202, including insurance providers, among others. Additionally, the notified entities 295 may include other interested parties 298, including personal contacts of the driver of the vehicle 202, including parents, family, friends, bosses, co-workers, or others. Different combinations of notified entities 295 may be notified depending on the type of incident, notification rules 228/292, and information associated with the incident.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 3:
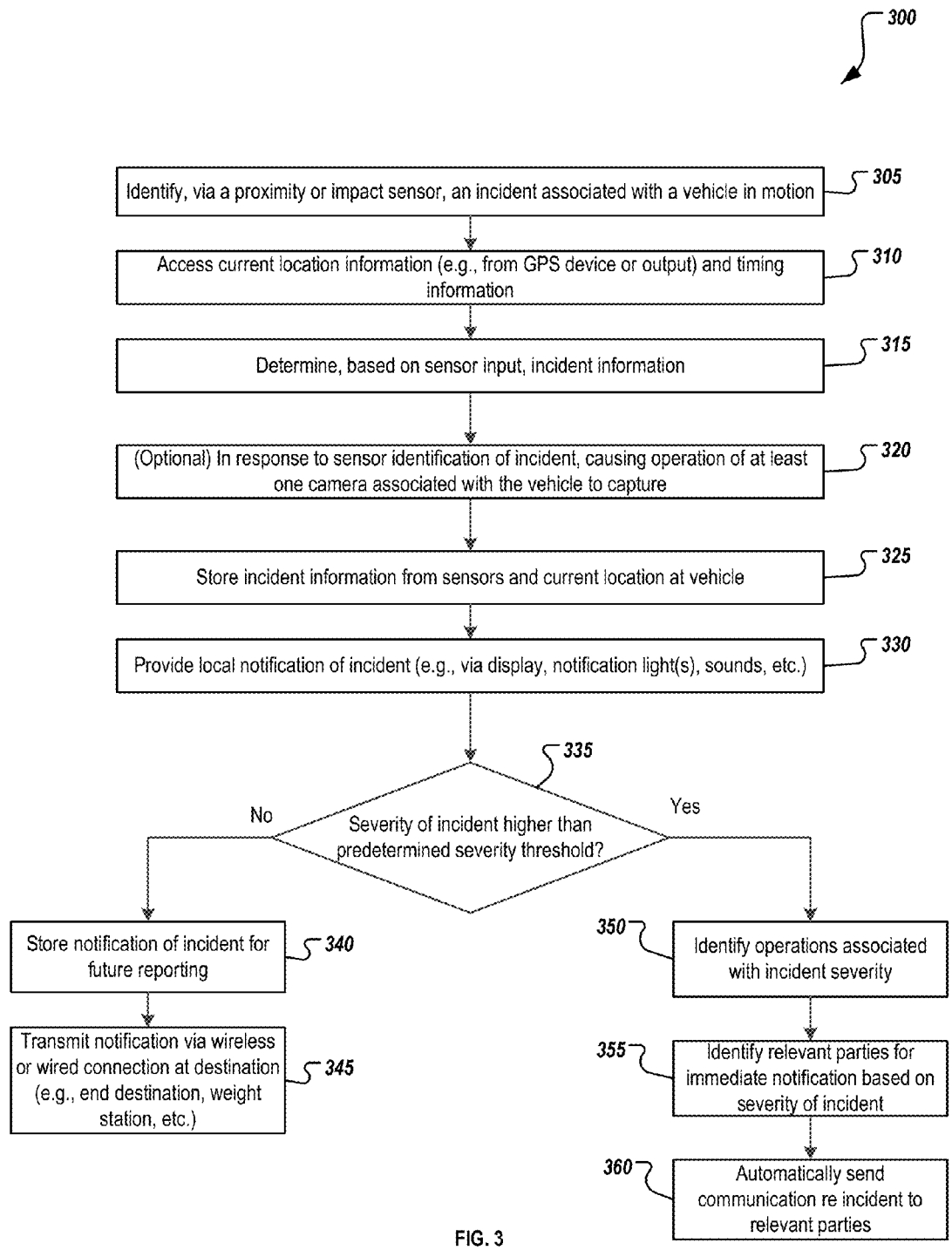
FIG. 3 flowchart of an example operation of detecting and reporting notifications of incidents.

FIG. 3 flowchart of an example operation 300 of detecting and reporting notifications of incidents. For clarity of presentation, the description that follows generally describes method 300 in the context of the illustrated systems 100, 200 of FIGS. 1A, 1B, and 2. However, it will be understood that method 300 may be performed, for example, by any other suitable system, environment, software, and hardware, or a combination of systems, environments, software, and hardware as appropriate.

At 305, an incident associated with a vehicle in motion is identified (e.g., via a proximity or impact sensor associated with the vehicle). Different types and tiers of incidents may be detected, including near misses detected by the proximity sensors, minor impacts (e.g., causing little to no damage), or major impacts causing potentially significant damage to the driver and passengers of the vehicle and/or other vehicles involved in the incident. Some of the operations performed may differ based on the severity of the incident, while other operations (e.g., recording the incident) may be similar. Further, as described in FIGS. 4 and 5, actions taken after the incident occurs may be relevant and used to determine operations to be taken after the incident is over.

At 310, and in response to identifying or detecting the incident, current location and timing information can be accessed for inclusion in an incident record. The location information may be determined via a GPS device integrated into the vehicle or from another device associated with the system (e.g., location information accessed from a connected mobile device).

At 315, based on the sensor input used to identify and detect the incident, incident information can be determined. The incident information can include, for a proximity alert, information on the distance between the vehicles or the vehicle and the object, information on the varying distances and the time in which the proximity threshold for an alert was triggered, the location on the vehicle at which the proximity alert was triggered (e.g., right rear, left rear, right side, left side, etc.) as well as other relevant information. For an impact, the incident information may include a measure of the force of the impact, the location on the vehicle at which the impact occurred, and other suitable and relevant information. Additional information for both types of sensor alerts may include the amount the vehicle moved in response to the incident (e.g., a swerve, etc.), a change in tilt of the vehicle, and other information. Some of the additional information may come from one or more other sensors, including accelerometers and gyroscopes associated with the system, as well as including information from one or more of the other sensors. For example, in response to an impact alert, information from one or more of the proximity sensors may assist in determining whether the impact could have been avoided by an alert driver due to a consistent relative closeness of the vehicles or objects, or if a sudden move by the driver of the vehicle or another vehicle caused the incident.

In some instances, at 320, and in response to a sensor identification of an incident, operations of at least one camera associated with the vehicle may be activated or initiated to capture images and or video of the current situation after the incident is identified. In some instances, previously captured images and/or video may also be identified where the at least one camera was already recording prior to and during the incident. Imagery and/or video from the incident may be used to assist in determining a cause of the incident, assigning and/or determining liability, and identifying witnesses and/or victims of the incident.

At 325, the combination of incident information obtained from the sensors and accessed information (including, optionally, any images or video) can be stored at the vehicle to provide a local copy of the incident report. In response to the incident, at 330, a local notification of the incident can be provided to the driver and any passengers. For example, the notification can be displayed on a GUI within the vehicle, via a notification light or lights, from one or more sounds projected into the vehicle (e.g., via speakers), or in any other suitable manner.

At 335, a determination of the relative or absolute severity of the incident is made, and in particular, as to whether the severity is higher than a predetermined severity threshold that causes the system to immediately communicate the incident to a particular party or entity. In some incidents, the severity of the incident may be based on a number of incidents received in a particular timeframe or period (e.g., if multiple proximity alerts are triggered within a five minute span at night), whether the force of an impact associated with an incident is above a force threshold, or other suitable thresholds as determined by a predefined set of operational rules.

If it is determined that the severity of the incident is less than the threshold, method 300 continues at 340, where the incident is stored at the vehicle for future reporting. At 345, notification of the incident can be transmitted via a wireless or wireline connection at a particular destination according to the rules, such as an end or intermediate destination, such as a weight station, truck stop, or gas station.

If it is determined that the severity of the incident is at or above the threshold, method 300 continues at 350, where notification operations associated with the incident severity are identified. In some instances, the predetermined severity threshold may determine whether an immediate notification is required, while additional thresholds above the predetermined threshold are defined to determine the particulars of the immediate notification to be provided. For example, an impact may be above the notification threshold, but the parties to be notified for various impact force levels can be different. At 355, relevant parties for immediate notification based on the severity of the incident are identified. At 360, communications providing notifications relating to the detected incident are automatically sent to the identified parties.

Figure 4:
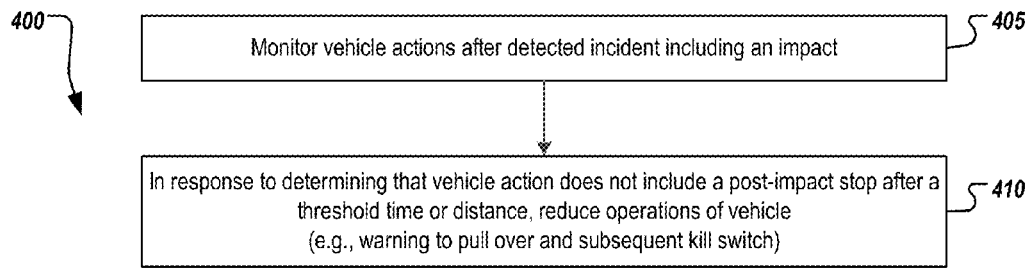
FIG. 4 is a flowchart of an example operation for modifying or reducing operations of the vehicle after an impact is detected.

FIG. 4 is a flowchart of an example operation 400 for modifying or reducing operations of the vehicle after an impact is detected. For clarity of presentation, the description that follows generally describes method 400 in the context of the illustrated systems 100, 200 of FIGS. 1A, 1B, and 2. However, it will be understood that method 400 may be performed, for example, by any other suitable system, environment, software, and hardware, or a combination of systems, environments, software, and hardware as appropriate.

At 405, vehicle actions after detecting an incident that includes an impact are monitored. In some instances, those actions may be whether the vehicle slows or stops within a predetermined time or distance from the location of the impact. At 410, in response to determining that the vehicle action does not include a post-impact stop after the predetermined or threshold time or distance, operations of the vehicle may be reduced or modified. In some instances, a notification to the driver and its passengers that engine functionality may be reduced can be provided, along with a request for the driver to pull over to a shoulder or other protected location on the road or highway. In some instances, an automated driving mode may be initiated to bring the vehicle to a stop. Once the vehicle is stopped, the engine may be turned off or the vehicle otherwise prohibited from continuing for a period of time. This solution ensures that after an impact, including those where the driver legitimately was unaware, at least one person (i.e., the driver) may be able to render immediate first aid. In some instances, method 400 may only be triggered at particular impact severity levels where possible catastrophic injury may be a likely result. In other instances, any impact may invoke the reduced operations, which can subsequently eliminate hit-and-run events via the shutdown of the vehicle's moving functions.

Figure 5:
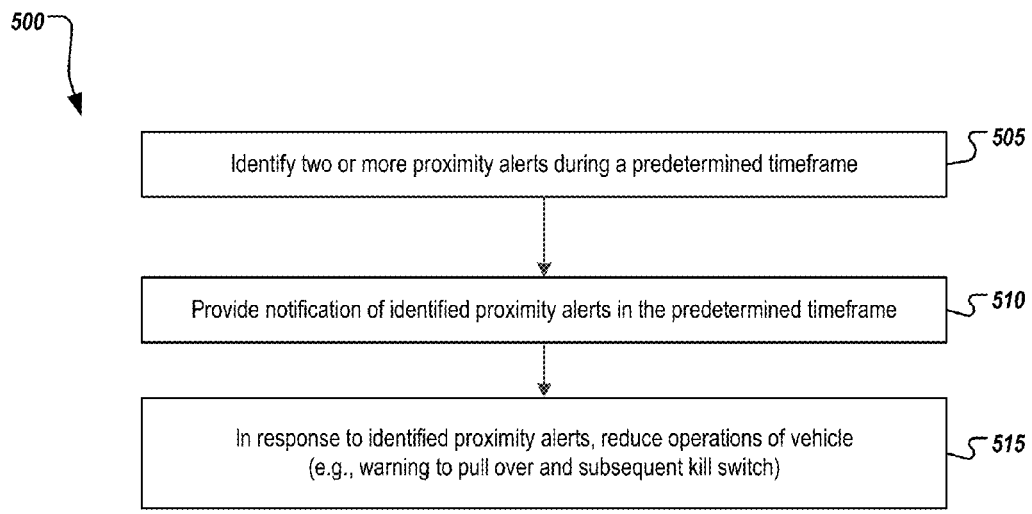
FIG. 5 is a flowchart of an example operation for modifying or reducing operations of the vehicle after two or more proximity alerts are detected during a predetermined timeframe.

FIG. 5 is a flowchart of an example operation 500 for modifying or reducing operations of the vehicle after two or more proximity alerts are detected during a predetermined timeframe. Method 500 is meant to provide an automated determination of potentially dangerous driving, either by the driver of the vehicle or a driver of another vehicle on the road based on multiple proximity alerts. In response to more than a predetermined number of proximity alerts in a given period, reduced operations can be enacted at the vehicle to reduce the likelihood of an immediate impact or crash. For clarity of presentation, the description that follows generally describes method 500 in the context of the illustrated systems 100, 200 of FIGS. 1A, 1B, and 2. However, it will be understood that method 500 may be performed, for example, by any other suitable system, environment, software, and hardware, or a combination of systems, environments, software, and hardware as appropriate.

At 505, two or more proximity alerts are identified or detected during a predetermined time period. The time period may be a set of seconds, minutes, or other time frame where the number of proximity alerts are monitored according to method 500. In some instances, method 500 may only be in use during particular times of the day, such as during evening or night time hours, or after a particular length of continuous driving (e.g., several hours or more). Alternatively or in addition, method 500 may be used based on driving conditions, such as when rain, fog, or excessive wind is detected. In general, method 500 may be useful where a driver of the vehicle, or other drivers on the road, are likely to be more dangerous due to tiredness, reduced visibility, or driving conditions. The number of proximity alerts associated with 505 may differ accordingly to various implementations. For example, the number may be set at any suitable number of proximity alerts. Further, the time frame may differ among various implementations and/or in different driving conditions or times.

At 510, a notification of the identified proximity alerts in the predetermined time period may be provided to the driver. In some instances, a final warning after X proximity alerts, where X equals a predetermined number, may be provided. At 515, in response to the identified proximity alerts, or in response to a final proximity alert after the notification, operations of the vehicle may be reduced or modified. In some instances, a notification to the driver and its passengers that engine functionality may be reduced can be provided, along with a request for the driver to pull over to a shoulder or other protected location on the road or highway. In some instances, an automated driving mode may be initiated to bring the vehicle to a stop. Once the vehicle is stopped, the engine may be turned off or the vehicle otherwise prohibited from continuing for a period of time. This solution can reduce the likelihood of an impact after a series of close call and near-misses are identified by the proximity sensors, allowing the driver to recover and regroup before continuing the trip.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
  detecting proximity alerts associated with a monitored vehicle, where detecting the proximity alerts comprises receiving an alert from at least one proximity sensor associated with the monitored vehicle, the monitored vehicle associated with a plurality of proximity sensors operable to determine when a proximity threshold is violated by an outside object or vehicle relative to the monitored vehicle, the proximity threshold comprising a particular distance from the monitored vehicle, and wherein detecting the proximity alerts includes:
    detecting, by the at least one proximity sensor and prior to an impact, an object or vehicle nearing the monitored vehicle within the particular distance associated with the proximity threshold; and
    triggering a proximity alert in response to the detection;
  determining, within a particular period of time, whether a plurality of received proximity alerts are triggered without a detected impact; and
  in response to determining that a number of received proximity alerts within the particular period of time without a detected impact exceed an alert threshold number:
    identifying at least one party to notify of the plurality of received proximity alerts; and
    automatically transmitting a notification of the plurality of received proximity alerts triggered during the particular period of time to the at least one identified party.

2. The method of claim 1, wherein each proximity sensor is associated with at least one camera.

3. The method of claim 2, wherein each proximity sensor is associated with a single, dedicated camera.

4. The method of claim 2, further comprising, in response to each triggered proximity alert, sending instructions to the at least one camera associated with the at least one proximity sensor associated with the triggered proximity alert to capture at least one image or video.

5. The method of claim 4, wherein the at least one camera is configured to capture at least one image or video of an area associated with the triggered proximity alert, the area including at least a portion of location in which the object or vehicle neared the monitored vehicle within the particular distance of the proximity threshold.

6. The method of claim 5, wherein, in response to each triggered proximity alert, the method further comprising:
identifying a geographic location of the monitored vehicle at a time of the triggered proximity alert; and
storing a record of the triggered proximity alert, the record including the identified geographic location of the monitored vehicle, the time associated with the triggered proximity alert, and the at least one image or video captured by the at least one camera in response to the triggered proximity alert.

7. The method of claim 6, wherein automatically sending the notification of the plurality of received proximity alerts triggered during the particular period of time to the at least one identified party includes sending the stored records associated with each of the plurality of received proximity alerts triggered during the particular period of time to the at least one identified party.

8. The method of claim 6, wherein the at least one identified party comprises an emergency responder, wherein automatically sending the notification to the at least one identified party includes sending an emergency response request to the emergency responder, the emergency response request including at least one geographic location of the proximity alerts.

9. The method of claim 6, wherein the monitored vehicle is transporting a shipment, wherein the at least one identified party comprises a party to the shipment, and wherein automatically sending the notification to the at least one identified party includes sending information associated with the proximity alerts triggered during the particular period of time to the party to the shipment.

10. The method of claim 1, further comprising, in response to determining that the number of received proximity alerts within the particular period of time without a detected impact exceed an alert threshold number, providing an indication of the plurality of received proximity alerts to a driver of the monitored vehicle.

11. The method of claim 1, wherein each of the plurality of sensors are attached to or embedded on the monitored vehicle.

12. The method of claim 1, the method further comprising:
in response to determining that the number of received proximity alerts exceed the alert threshold number, reducing operations of the monitored vehicle.

13. The method of claim 12, wherein reducing operations of the monitored vehicle includes causing the monitored vehicle to reduce its driving capabilities and stop the monitored vehicle.

14. The method of claim 1, wherein the particular distance from the monitored vehicle associated with the proximity threshold is a predetermined distance.

15. The method of claim 1, wherein the particular period of time is a predetermined period of time.

16. A system comprising:
one or more processors; and
a computer-readable medium storing instructions executable by the one or more processors to perform operations comprising:
detecting proximity alerts associated with a monitored vehicle, where detecting the proximity alerts comprises receiving an alert from at least one proximity sensor associated with the monitored vehicle, the monitored vehicle associated with a plurality of proximity sensors operable to determine when a proximity threshold is violated by an outside object or vehicle relative to the monitored vehicle, the proximity threshold comprising a particular distance from the monitored vehicle, and wherein detecting the proximity alerts includes:
detecting, by the at least one proximity sensor and prior to an impact, an object or vehicle nearing the monitored vehicle within the particular distance associated with the proximity threshold; and
triggering a proximity alert in response to the detection;
determining, within a particular period of time, whether a plurality of received proximity alerts are triggered without a detected impact;
in response to determining that a number of received proximity alerts within the particular period of time without a detected impact exceed an alert threshold number:
identifying at least one party to notify of the plurality of received proximity alerts; and
automatically transmitting a notification of the plurality of received proximity alerts triggered during the particular period of time to the at least one identified party.

17. The system of claim 16, wherein each proximity sensor is associated with at least one camera.

18. The system of claim 17, the operations further comprising, in response to each triggered proximity alert, sending instructions to the at least one camera associated with the at least one proximity sensor associated with the triggered proximity alert to capture at least one image or video.

19. The system of claim 18, wherein, in response to detecting the proximity alert, the operations comprise:
identifying a geographic location of the monitored vehicle at a time of the triggered proximity alert; and
storing a record of the triggered proximity alert, the record including the identified geographic location of the monitored vehicle, the time associated with the triggered proximity alert, and the at least one image or video captured by the at least one camera in response to the triggered proximity alert.

20. A non-transitory computer storage medium encoded with a computer program, the computer program comprising instructions that, when executed by one or more computers, cause the one or more computers to perform operations comprising:
detecting proximity alerts associated with a monitored vehicle, where detecting the proximity alerts comprises receiving an alert from at least one proximity sensor associated with the monitored vehicle, the monitored vehicle associated with a plurality of proximity sensors operable to determine when a proximity threshold is violated by an outside object or vehicle relative to the monitored vehicle, the proximity threshold comprising a particular distance from the monitored vehicle, and wherein detecting the proximity alerts includes:
detecting, by the at least one proximity sensor and prior to an impact, an object or vehicle nearing the monitored vehicle within the particular distance associated with the proximity threshold; and
triggering a proximity alert in response to the detection;
determining, within a particular period of time, whether a plurality of received proximity alerts are triggered without a detected impact; and
in response to determining that a number of received proximity alerts within the particular period of time without a detected impact exceed an alert threshold number:
identifying at least one party to notify of the plurality of received proximity alerts; and
automatically transmitting a notification of the plurality of received proximity alerts triggered during the particular period of time to the at least one identified party.

* * * * *